United States Patent Office 2,859,833
Patented Nov. 11, 1958

2,859,833

RECOVERY OF ACETYLENE FROM GASES, AND ACETYLENE-N-SUBSTITUTED PYRROLE COMPOSITIONS

William T. Nelson, Bartlesville, Okla., assignor to Phillips Petroleum Company, a corporation of Delaware No Drawing. Application August 23, 1954
Serial No. 451,710

10 Claims. (Cl. 183—115)

This invention relates to the recovery of acetylene from a stream of gases containing the same employing a selective solvent and to novel compositions of matter thus obtained as well as to uses for said compositions of matter. In one of its aspects the invention relates to the recovery of acetylene from gases containing same by contacting said gases with an N-substituted-pyrrole. In another of its aspects the invention relates to novel solutions of acetylene dissolved in an N-substituted-pyrrole. In a furthere aspect the invention relates to the operation of a rocket or thrust engine employing as a hypergolic fuel component a solution of acetylene in an N-substituted-pyrrole.

It has now been found that N-substituted-pyrroles, especially those containing up to 5 carbon atoms in a substituent alkyl radical can be advantageously utilized for the recovery of acetylene. It has also been found that solutions thus obtained are suitable as components of bipropellant materials, i. e., that such solutions are suitable as fuel components. Specifically, pyrroles which are now preferred because they are available and because their properties are most suitable for the intended uses of the invention are the N-methyl-, N-ethyl-, N-propyl-, N-butyl-, N-amyl- and N-acetyl-pyrrole. Generally, N-substituted-pyrrole can be represented by the formula:

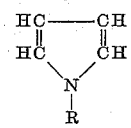

wherein R is the substituent.

The solvent action of these individual materials makes them useful in processes involving the solution of acetylene. These solvents are suitable for the recovery of acetylene from gas mixtures, for preparing solutions of acetylene under pressure for the purpose of storage and shipment, and for other acetylene solvent uses, e. g., in chemical reactions where acetylene undergoes reaction in the form of a solution.

A solution of acetylene and N-methyl-pyrrole is particularly suitable as a rocket fuel component, particularly since the acetylene will act as a combustion and burning rate improver. An additional advantage of the use of acetylene in N-methyl-pyrrole is the improved performance in ignition delay, freezing point, specific thrust and burning characteristics.

N-methyl-pyrrole is capable of dissolving more than 7.3 times its volume of acetylene at 25° C. under one atmosphere partial pressure of acetylene. By the employment of pressure, considerably more acetylene can be dissolved in the N-alkyl-pyrroles, if desired.

Example I

The solubility of acetylene in N-methyl-pyrrole was determined at 25° C. (77° F.) and at 1 atmosphere partial pressure of solute. The acetylene solubility is expressed in terms of the Bunsen coefficient, which is defined as the volume of gas, calculated at 760 MM and 0° C. (32° F.), dissolved per volume of solvent at one atmosphere partial pressure of gas. The Bunsen coefficient for N-methyl-pyrrole was found to be 7.3.

According to the invention, the acetylene is recovered and the solutions and/or compositions of the claims prepared by contacting the acetylene or acetylene-containing gas with the selected N-substituted-pyrrole employing modus operandi which one skilled in the art in possession of this disclosure can supply.

Various liquids and liquid combinations have been found useful as rocket propellants. Some propellants consist of a single material, and are termed "monopropellants." Those propellants involving two materials, an oxidizer and a fuel, are termed "bipropellants." Hydrogen peroxide and nitromethane are each well known monopropellants. Well known bipropellants include hydrogen peroxide or liquid oxygen as the oxidant with a fuel component such as ethyl alcohol-water, ammonia, hydrazine, or hydrogen; and nitric acid as the oxidizer with aniline or pyrrole as the hypergolic fuel component. There are several types of nitric acid mixtures which are used as oxidizers in rocket propellants, namely, white (WFNA) or red (RFNA) fuming nitric acids. A fuel component of a bipropellant material of the type described previously is spontaneously combustible upon contacting the oxidizer at ambient pressure and temperature, and for that reason is referred to as being "hypergolic."

Acetylene is known to be an excellent component of jet fuels. It is further known to be an excellent gas for use in gas assist nozzles for jet planes. Practical use of acetylene for these uses has been hindered owing to the difficulties of carrying practical quantities of acetylene in aircraft. It is also recognized that acetylene is a very desirable fuel for rockets due to its high total energy content and its high flame velocities relative to other hydrocarbons. But it is very unstable, and unless special precautions are taken, is a dangerous substance, decomposing violently under a variety of circumstances. However, if the acetylene is dissolved in another combustible which is liquid, the use of acetylene in a rocket becomes more practical.

Other oxidizers are suitable as oxidants for the new fuels of my invention, in addition to white or red fuming nitric acid. Suitable oxidants include materials such as hydrogen peroxide, ozone, nitrogen tetroxide, liquid oxygen, and mixed mineral acids, especially anhydrous mixtures of nitric and sulfuric acids.

According to the invention, therefore, there has been provided a method for the operation of a thrust engine which comprises employing in said engine as at least a component of its fuel a solution of acetylene in an N-substituted-pyrrole.

Reasonable variation and modification are possible within the scope of the present invention and the appended claims to the invention, the essence of which is that N-substituted-pyrroles, for example N-alkyl-pyrroles, have been found to be useful for the absorption of acetylene by solvent action from gases containing same and that novel compositions of matter useful as components of rocket fuel and as storage for acetylene have been set forth.

I claim:

1. A solution of an acetylene in a compound of the formula

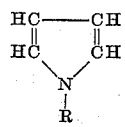

wherein R is selected from the group consisting of alkyl groups and the acetyl group.

2. A solution of an acetylene in an N-alkyl-pyrrole.

3. A solution of an acetylene in an N-alkyl-pyrrole in which the alkyl group contains 1 to 5 carbon atoms.

4. A solution of an acetylene in an N-acetyl-pyrrole.

5. A solution of acetylene dissolved in N-methyl-pyrrole.

6. A method for forming a solution of acetylene which comprises contacting acetylene under gas-absorbing conditions of temperature and pressure with a compound of the formula

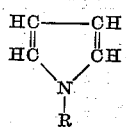

wherein R is selected from the group consisting of alkyl groups of 1 to 5 carbon atoms inclusive and the acetyl group.

7. A method for the recovery of acetylene which comprises contacting a gas consisting essentially of acetylene with a compound of the formula

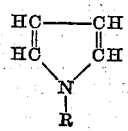

wherein R is selected from the group consisting of alkyl groups of 1 to 5 carbon atoms, the contacting being effected under gas absorption conditions of temperature and pressure.

8. A method according to claim 7 wherein the compound is N-methyl-pyrrole.

9. A method for the recovery of acetylene which comprises contacting acetylene in form with N-acetyl-pyrrole.

10. A method for the recovery of acetylene which comprises contacting and thus dissolving by absorption therein acetylene with N-methyl-pyrrole.

References Cited in the file of this patent

UNITED STATES PATENTS

| 2,393,132 | Wagner | Jan. 15, 1946 |
| 2,563,305 | Britton et al. | Aug. 7, 1951 |
| 2,573,471 | Malina et al. | Oct. 30, 1951 |
| 2,659,453 | Robinson | Nov. 17, 1953 |
| 2,664,997 | Eck | Jan. 5, 1954 |
| 2,670,810 | Dorsey | Mar. 2, 1954 |
| 2,690,386 | Hager et al. | Sept. 28, 1954 |
| 2,774,214 | Malina et al. | Dec. 18, 1956 |